June 19, 1956     E. F. AUMULLER ET AL     2,751,056
ELECTROMAGNETIC CLUTCH
Filed March 26, 1951
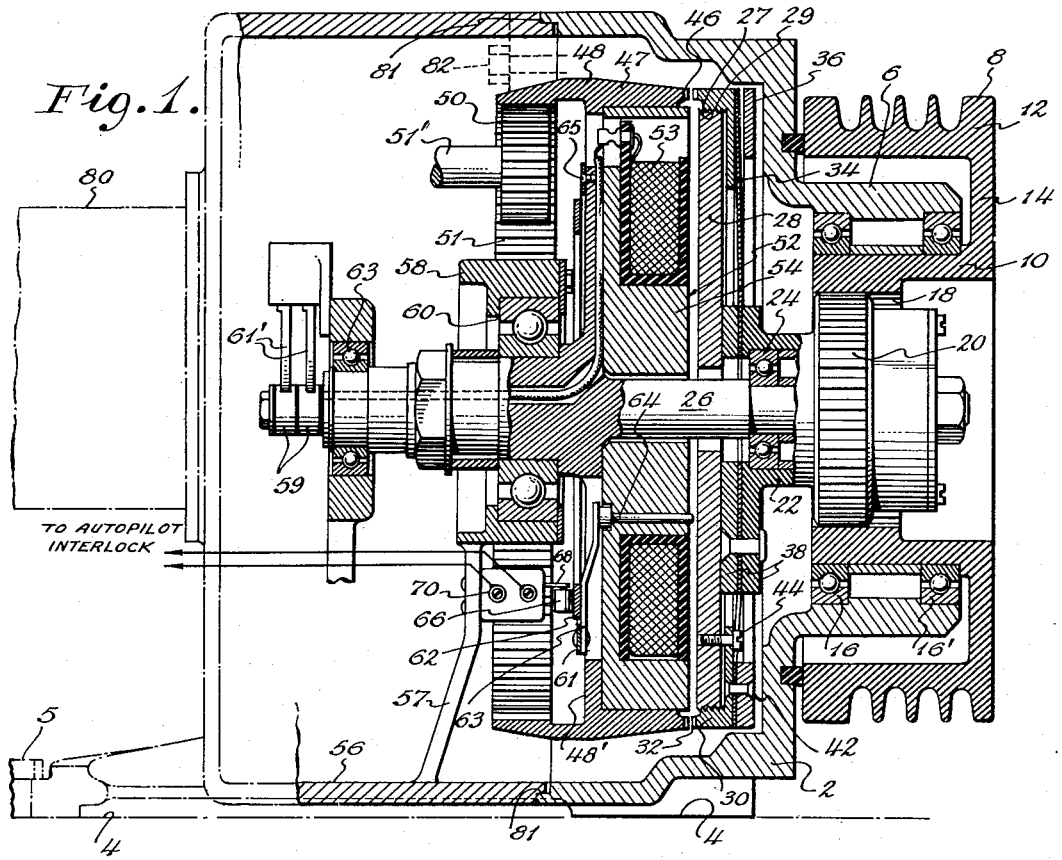
Fig. 1.
TO AUTOPILOT INTERLOCK
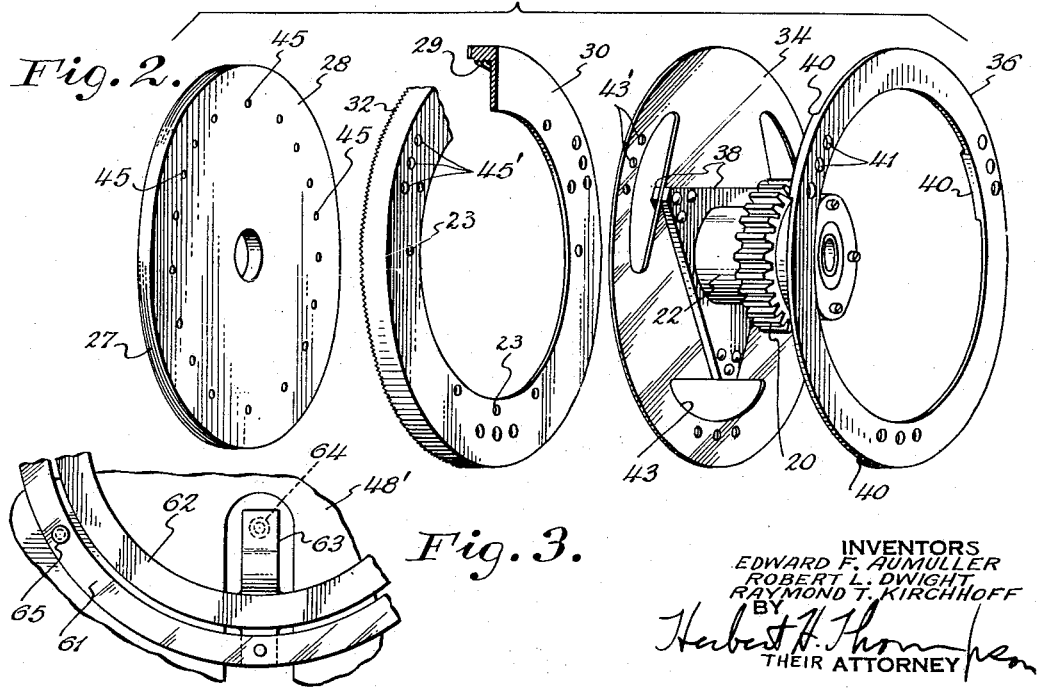
Fig. 2.
Fig. 3.
INVENTORS
EDWARD F. AUMULLER
ROBERT L. DWIGHT
RAYMOND T. KIRCHHOFF
BY Herbert H. Thompson
THEIR ATTORNEY

United States Patent Office 2,751,056
Patented June 19, 1956

2,751,056

ELECTROMAGNETIC CLUTCH

Edward F. Aumuller, Lynbrook, Robert L. Dwight, Oyster Bay, and Raymond T. Kirchhoff, Smithtown, N. Y., assignors to Sperry Rand Corporation, a corporation of Delaware Application March 26, 1951, Serial No. 217,634

3 Claims. (Cl. 192—84)

This invention relates to detachable clutches for interconnecting a servomotor and the apparatus controlled thereby and has more special application to aircraft having automatic pilots, wherein such clutches are usually provided between the servomotor for each main control surface on the craft and such surface, so that each surface may be easily and directly controlled by hand, at will, or in case the servomotor or automatic pilot fails. Such servomotors usually comprise an electric motor and reduction gearing connecting it to a cable drum through such a disconnectable clutch adjacent the cable drum which is subject, therefore, to large torques.

According to our improvement, we propose to design such a clutch so that it may be readily controlled accurately from a distance, and constructed in a compact manner with a minimum weight and with maximum reliability. By our invention, we also construct it so that it is fail safe, that is, in case of failure of the electrical system the clutch will be biased to open position so that the airplane may be readily controlled by hand without turning the electric motor.

A further feature of our invention is that the clutch, together with the servomotor, is so designed that it may be readily detached from the airplane, inspected and repaired without disturbing the control drum and cables.

More particularly, our invention is an improvement over the clutch mechanism shown in the prior patent to Robert S. Curry, Jr., No. 2,535,046, dated December 26, 1950, for Servomotors and assigned to the assignee of the present application.

It will be obvious from the following description that our invention is applicable to other fields than the aeronautic field.

Referring to the drawings illustrating the preferred form of our invention,

Fig. 1 is a vertical section through our improved clutch and its associated parts;

Fig. 2 is an exploded view of the spring biased armature portion of the clutch; and Fig. 3 is a fragmentary detail of a spring suspended roller track associated with the clutch which operates a switch appropriately connected to the automatic pilot interlock circuits.

The basic framework of our servo drive comprises a housing 2 having an extended base 4 adapted to be bolted to the airplane structure as at 5. Said housing is provided with a cylindrical extension or hub 6 within which is journalled the cable drum 8 on anti-friction bearings 16, 16', said drum being shown as composed of inner and outer rims 10 and 12 integrally connected by web 14. The inner surface of rim or ring 10 is provided with internal gear teeth or splines 18 having a slidable but non-rotatable engagement with exterior teeth or splines 20 on the driven sleeve or hollow shaft 22 of the clutch, said sleeve or shaft being journalled in anti-friction bearings 24 on supporting shaft 26.

The clutch member proper is preferably made up of a plurality of rings or discs as follows: disc 28 constituting the armature of the clutch, cupped or channel ring 30 which carries the annular clutch teeth 32 in the form of a crown gear around its rim or periphery, thin, resilient disc 34 secured to the driven shaft 22, and the outer clamp ring 36. The periphery of the armature disc 28 is shown as provided with threads 27 which are threaded into internal threads 29 on the interior of rim 30. After being threaded into place at the desired spacing from the exciting magnet hereinafter described, it is clamped into place by screws 44 passing through holes 23 in ring 30 and threaded in holes 45 in disc 28. The proper spacing may be secured readily by firmly engaging the clutch teeth 32, 46 mechanically and screwing the disc 28 in until it lightly engages the face of the magnet 54 (hereinafter described). This adjustment affords a minimum working air-gap and hence a maximum axially exerted force when the magnet is excited.

The shaft 22 is firmly riveted to the spring disc 34 as by means of the triangular plates 38 on each side of the disc, one of which is fastened to or made integral with the sleeve shaft 22. The spring disc 34 is tightly clamped between the spaced raised portions 40 on ring 36 and the upper flat surface of the ring 30 as by means of a plurality of rivets 42 placed through each raised portion 40 and extending through holes 41, 43' and 45' in each ring or disc.

Cut outs 43 are provided in disc 34 between the points where ring 36 clamps the disc at 40, and the points where plate 38 is riveted to the disc. The entire construction is such that the disc is biased to normally hold the clutch open, but it is quite flexible axially to permit axial movement of the clutch to close it upon the application of a small pull, but provides a substantially rigid coupling for transmitting rotary torques. To this end, the clearance between the ring 36 and disc 34 between the clamping points 40 is made quite small to prevent or limit crinkling or distortion of the spring disc under torsion, and yet is sufficient to prevent constraint of the axial movement of the clutch. It will be observed that with this construction, the driven member of the clutch is supported on radial bearings 24 and that no sliding friction occurs upon movement of the clutch, since the shaft 22 remains fixed axially and the motion of the clutch teeth is permitted solely by the axial flexing of spring disc 34.

The opposing clutch face is shown as comprising a complementary crown gear 46 on the rim 47 of a wheel or pulley-like member 48 which may be made integral with shaft 26. Said shaft is driven from a pinion 50 which meshes with internal gear 51 on the interior of rim 47. Within member 48 is mounted a flat, channeled electromagnet 52 having winding 53 and core 54 which attracts the armature 28 when the winding is excited. The housing 56 or mounting for the detachable portion of the clutch assembly is shown at 56 detachably engaging the first unit around its front periphery at 81 and held in place by screws 82. In the center of housing 56 is mounted on radial brackets 57, a bearing member 58 within which the shaft 26 is journalled in bearings 60 and 63. Current for winding 53 is led in through slip rings 59 on shaft 26 and brushes 61'. The servomotor 80 which drives shaft 51' of pinion 50 is mounted on shell 56. The reduction gearing between the motor and shaft 51' is omitted, but may be similar to that shown in the aforesaid Curry patent except that no auxiliary clutch is needed in our invention.

A switch or switches are also preferably provided on the clutch connected with the interlock circuits of the automatic pilot in such a way as to preclude the possibility of the main pilot switch being turned to the "on" position unless clutch disengagement is effective and to prevent the occurrence of subsequent sequential operations of the automatic pilot unless clutch engagement has taken place. For this purpose, we have shown, mounted on the backside of the web 48' connecting shaft 26 and rim 47 of member 48, a pair of rings 61, 62. Ring 62 is provided with a plurality of radially extending fingers 63, which at their inner ends normally engage by means of pins 64 the outer face of the armature or plate 28 on the opposing clutch member. The outer ends of said fingers are shown as secured to the second ring 61 which is made quite flexible. Ring 61 in turn is secured at circumferentially spaced points 65, to the web 48', and the arrangement is such that the ring 61 acts as a spring to hold the fingers 63 against the tops of the push pins 64 to hold them in. When, however, the plate 28 is attracted by the magnet to close the clutch, the pins 64 are pushed to the left in Fig. 1 pushing the ring 62 outwardly against the spring bias of spring 61. In this position, roller 66 on arm 68 of a small switch or switches 70 is pushed to the left to operate the switch, which is placed in the interlock circuit of the automatic pilot, so that the automatic pilot cannot be thrown into full operation until the clutch is closed. The spring bias of disc 34 assures the opening of the clutch, when winding 53 is unexcited due to any cause.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. An electromagnetic jaw clutch for coupling two shafts comprising a pair of crowned rings forming two parts of the jaw clutch, a plate of magnetic material housed in one side of one ring and secured thereto, a spring disc secured at spaced points around its periphery to the other side of said ring, said disc having a plurality of cutout portions around its periphery and being secured near its center to one of said shafts, an axially spaced member of magnetic material housed in one side of the other ring, a winding for magnetizing said member and pulling said plate toward it against the bias of said disc, and a clamp ring on the far side of said disc clamping the disc to the first mentioned crowned ring around its periphery at spaced points only to permit limited bending axially, causing or permitting disengagement and engagement of the clutch as said winding is energized and deenergized and also transmitting torque to the shaft without buckling.

2. In an aircraft disconnectable servo and clutch unit for moving the cable drum of a control surface, a housing unit subassembly including a base adapted to be permanently attached to the aircraft, a cable drum journalled thereon having internal teeth or splines, a second housing unit subassembly comprising a servomotor and a housing having a readily detachable engagement with said first housing, a two element jaw clutch journalled within said second housing but extending forwardly into said first housing including clutch operating mechanism and a shaft journalled in said second housing to which one part of said clutch is fixed and which also extends within said first housing, the other part of said clutch having a hub portion journalled on the forward end of said shaft and having complementary splines within said internal splines of said cable drum when the two housings are secured together, whereby the second subassembly including the entire clutch mechanism and servomotor may be readily removed from the aircraft for replacement, inspection or repair, without disturbing the cable drum.

3. An aircraft disconnectible servo and clutch unit as claimed in claim 2, having an electromagnet in said second housing for energizing said clutch and in which the driven element of said clutch has a spring disc secured near its center to said element, and a disc-like armature secured at its periphery to said disc and adapted when said electromagnet is excited to pull the armature against the bias of said disc to engage the clutch.

References Cited in the file of this patent
UNITED STATES PATENTS

| | | |
|---|---|---|
| 405,223 | Perret | June 11, 1889 |
| 1,491,426 | Schunemann | Apr. 22, 1924 |
| 1,989,984 | Hope | Feb. 5, 1935 |
| 2,055,723 | Hope | Sept. 29, 1936 |
| 2,057,876 | Berry | Oct. 20, 1936 |
| 2,308,370 | Kellett | Jan. 12, 1943 |
| 2,407,757 | MacCallum | Sept. 17, 1946 |
| 2,535,046 | Curry | Dec. 26, 1950 |
| 2,549,815 | Huntington | Dec. 26, 1950 |